(12) United States Patent
Lam et al.

(10) Patent No.: US 8,753,429 B2
(45) Date of Patent: Jun. 17, 2014

(54) AIRCRAFT FUEL TANK VENTILATION

(75) Inventors: Joseph K-W Lam, Bristol (GB); David Parmenter, Uckfield (GB); Simon Masters, Bristol (GB)

(73) Assignee: Airbus Operations Limited, Bristol (GB)

( * ) Notice: Subject to any disclaimer, the term of this patent is extended or adjusted under 35 U.S.C. 154(b) by 99 days.

(21) Appl. No.: 13/381,693

(22) PCT Filed: Jul. 9, 2010

(86) PCT No.: PCT/GB2010/051131
§ 371 (c)(1),
(2), (4) Date: Dec. 30, 2011

(87) PCT Pub. No.: WO2011/010123
PCT Pub. Date: Jan. 27, 2011

(65) Prior Publication Data
US 2012/0103192 A1 May 3, 2012

(30) Foreign Application Priority Data
Jul. 22, 2009 (GB) .................. 0912710.1

(51) Int. Cl.
*B01D 53/02* (2006.01)

(52) U.S. Cl.
USPC .......... 95/122; 95/126; 95/148; 96/144; 96/146; 244/135 R

(58) Field of Classification Search
USPC .............. 95/148, 139; 96/146, 143, 126
See application file for complete search history.

(56) References Cited

U.S. PATENT DOCUMENTS

| | | | |
|---|---|---|---|
| 2,860,815 A | 11/1958 | Finn et al. | |
| 3,419,233 A | 12/1968 | Wotton | |
| 6,048,509 A * | 4/2000 | Kawai et al. | 423/230 |
| 6,432,169 B1 * | 8/2002 | Kluwe et al. | 95/52 |
| 2009/0293848 A1 * | 12/2009 | Raymo, Sr. | 123/518 |
| 2010/0000305 A1 * | 1/2010 | Stephenson et al. | 73/73 |

FOREIGN PATENT DOCUMENTS

| | | |
|---|---|---|
| GB | 1067591 A | 5/1967 |
| GB | 2379607 A | 3/2003 |

OTHER PUBLICATIONS

John S. Denker, See How It Flies, copyright 1996-2008, Title page.*
John S. Denker, See How It Flies, copyright 1996-2008, Chapter 3, p. 6, accessed via internet Jul. 3, 2013.*
Search Report for GB 0912710.1 dated Oct. 16, 2009.
Search Report for GB 0912710.1 dated Dec. 9, 2009.
International Search Report for PCT/GB2010/051131 dated Oct. 20, 2010.

* cited by examiner

*Primary Examiner* — Duane Smith
*Assistant Examiner* — Cabrena Holecek
(74) *Attorney, Agent, or Firm* — Lowe Hauptman & Ham, LLP

(57) ABSTRACT

An aircraft fuel tank ventilation system includes a dehumidifying device disposed in flow communication between a vent open to the atmosphere and a fuel tank. A method of dehumidifying air introduced into an aircraft fuel tank via a ventilation system includes directing atmospheric air through a dehumidifying device disposed in flow communication between a vent of the ventilation system and the fuel tank, which removes water vapor from the air flowing from the vent towards the fuel tank. A method of regenerating a desiccant medium used to dehumidify air introduced into an aircraft fuel tank via a ventilation system includes directing air through the desiccant medium so as to dry the desiccant medium.

13 Claims, 10 Drawing Sheets

AIRCRAFT FUEL TANK VENTILATION

RELATED APPLICATIONS

The present application is a National Phase of International Application Number PCT/GB2010/051131, filed Jul. 9, 2010 and claims priority from British Application Number 0912710.1, filed Jul. 22, 2009.

FIELD OF THE INVENTION

The present invention relates to an aircraft fuel tank ventilation system having a dehumidifying device. The present invention also relates to a method of dehumidifying air being introduced into an aircraft fuel tank, and to a method of regenerating a desiccant medium used to dehumidify air introduced into an aircraft fuel tank.

BACKGROUND OF THE INVENTION

Water is an unavoidable contaminant in fuel. It can affect fuel system component reliability and lead to operational delays and increased maintenance activities. In addition, the propensity for microbiological contamination is directly proportional to the presence of water and the temperature within fuel tanks. Sources of water in aircraft fuel tanks is from fuel loaded into the aircraft fuel tanks during refuel (dissolved water) and from air entering the aircraft fuel tanks via its ventilation system. It is estimated that up to 30-40% of water in the fuel of aircraft fuel tanks is currently entering via the ventilation system, depending on atmospheric conditions.

During refill while the aircraft is on the ground, fuel is loaded onto the aircraft at a high volume flow rate to reduce the turnaround time. The fuel displaces the air in the fuel tanks as the tanks fill up. The air is pushed out of the fuel tanks via the ventilation system.

During climb, due to decreasing ambient pressure as the aircraft ascends, air expands in the ullage. Although the engines are consuming fuel, the rate of fuel consumption is less than the rate of air expansion. This results a net outflow of air through the ventilation system.

During cruise, the fuel level decreases steadily as the engines consume the fuel. A decrease in the fuel level causes an increase in the ullage volume, and excess air is drawn in from ambient via the ventilation system to equalise pressures. At cruise, the ambient air is relatively cold and dry.

During descent, due to increasing ambient pressure as the aircraft descends, air contracts in the ullage. This results a net inflow of ambient air through the ventilation system. The ingress of ambient air brings relatively warm, humid air into the fuel system. Water condenses when the humid air comes into contact with cold structures and surfaces in the fuel system. The cold surfaces may be, for example, the fuel tank and equipment surfaces, or the fuel-air interface. The fuel system is cold during descent as the aircraft will likely have just spent some time at cold, cruise temperatures.

There is therefore a need in the art for a system and methods for reducing the ingress of moisture into an aircraft fuel tank via its ventilation system.

SUMMARY OF THE INVENTION

A first aspect of the invention provides an aircraft fuel tank ventilation system, comprising a dehumidifying device disposed in flow communication between a vent open to the atmosphere and a fuel tank.

A second aspect of the invention provides a method of dehumidifying air introduced into an aircraft fuel tank via a ventilation system, the method comprising directing atmospheric air through a dehumidifying device disposed in flow communication between a vent of the ventilation system and the fuel tank, which removes water vapour from the air flowing from the vent towards the fuel tank.

A third aspect of the invention provides a method of regenerating a desiccant medium used to dehumidify air introduced into an aircraft fuel tank via a ventilation system, the method comprising directing air through the desiccant medium so as to dry the desiccant medium.

The invention is advantageous in that water can be effectively removed from air entering the aircraft fuel tank. In this way, the content of water in the fuel tank can be kept low, which improves fuel system component reliability, reduces maintenance activities, and reduces microbiological contamination.

The system and method of the first and second aspects of the invention are particularly effective at removing moisture from ingress humid air during descent. In a preferred embodiment of the invention, the dehumidifying device includes a desiccant medium. However, it will be appreciated that other types of dehumidifying devices may be used in the system and method of the first and second aspects, such as a condenser. Where desiccant medium is used in the dehumidifying device, the method of the third aspect is particularly effective at regenerating the desiccant medium during cruise, so that the system may be maintenance-free. However, the desiccant medium may additionally or alternatively be regenerated during other phases of the flight, such as climb. What is important is that for air drying of the desiccant medium, there is a net flow of relatively drier air through the desiccant medium. Suitable commonly used desiccant media which are suitable for use with this invention are silica gel, calcium sulfate, calcium chloride, montmorillonite clay, and molecular sieves. Those skilled in the art will appreciate that this is not an exhaustive list and other media may be used.

The dehumidifying device may include a heating element. The heating element may be a heat exchanger or an electrical heating device, for example, for heating the desiccant medium and/or for preventing ice accumulation within the device. Alternatively, or additionally, the dehumidifying device may further comprise a hot air outlet disposed adjacent the desiccant medium. Heating the desiccant medium promotes drying by evaporating moisture into air passing through the desiccant medium in a flow direction towards the atmosphere, so regenerating the desiccant medium. Heating the dehumidifying device as a whole prevents ice accumulation and therefore promotes free flow of air through the conduits of the device.

In some circumstances, it may be beneficial that air passing between the vent and the fuel tank does not pass through the dehumidifying device. For example, the high volume flow rate of air exiting the fuel tank via the vent during refuelling may be too high to pass through the dehumidifying device. The ventilation system may therefore further include a bypass of the dehumidifying device in flow communication between the vent and the fuel tank. The bypass may include a valve. The valve may be used for controlling flow through the bypass.

Many aircraft fuel systems include a vent tank for equalizing pressure changes between ambient and the ullage(s). In a preferred embodiment, the dehumidifying device is disposed in flow connection between the vent and the vent tank. The vent tank may include an outlet selectively open to the atmosphere, such as a pressure relief valve, for example.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
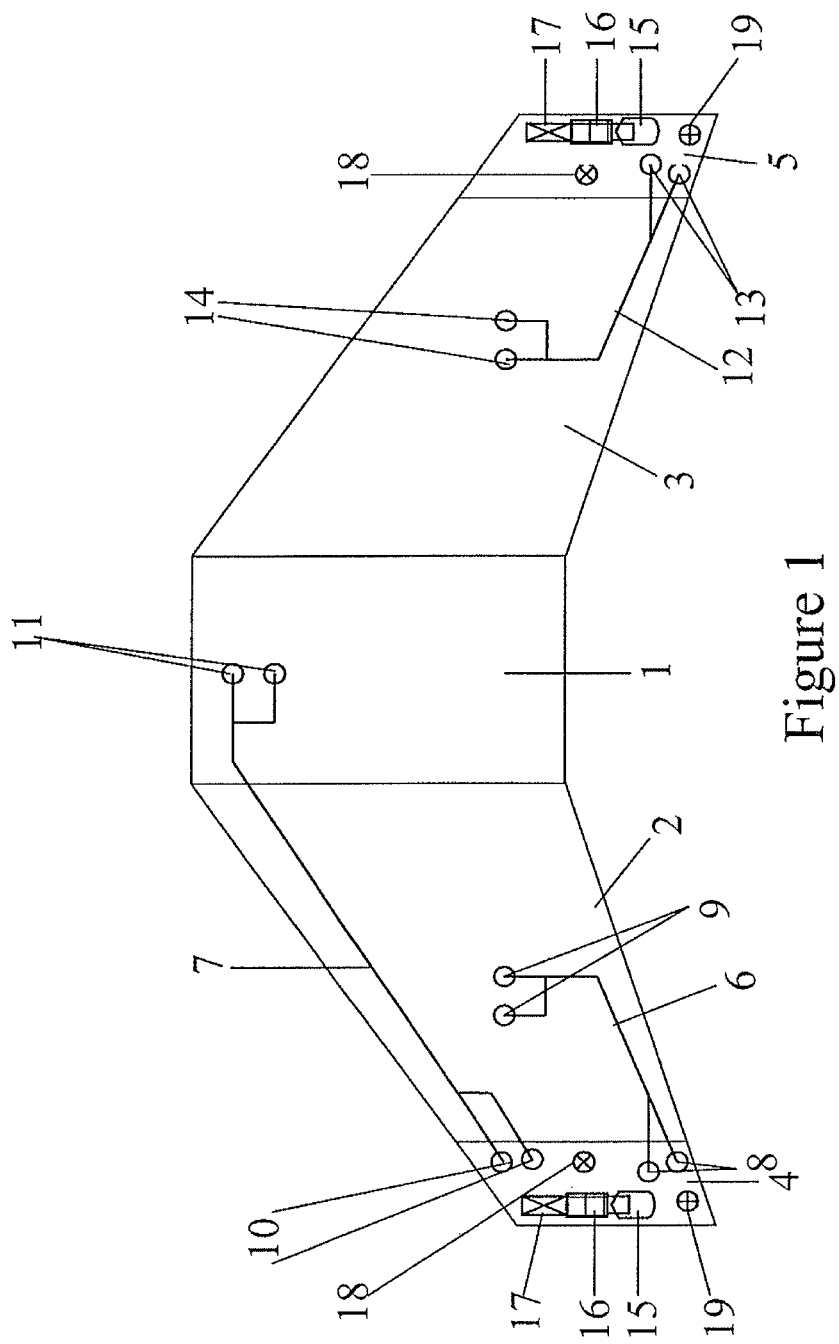
FIG. 1 illustrates schematically an aircraft wing having three fuel tanks and a ventilation system including a dehumidifying device.

FIG. 1 shows a general ventilation system architecture for a three-tank configuration of an aircraft fuel system. The fuel system includes a centre tank 1, a left wing tank 2 and a right wing tank 3. The ventilation system includes a left vent tank 4 and a right vent tank 5. The left vent tank 4 ventilates the centre tank 1 and the left wing tank 2 by means of ventilation pipes 6, 7 which open into ventilation inlets 8, 9, 10, 11. The right vent tank 5 ventilates the right wing tank 3 by means of ventilation pipe 12 which opens into ventilation inlets 13 and 14. The centre tank could equally be vented by the right vent tank. It is to be noted that all of the fuel tanks are ventilated but are not cross-ventilated, i.e. the left and right vent tanks are not connected by ventilation paths.

Each vent tank 4, 5 includes a NACA vent, or NACA scoop, 15 which opens to the atmosphere on the lower aerodynamic surface of the aircraft wing. The vent tanks 4, 5 further include a vent protector, or flame arrestor, 16 and a dehumidifying device 17. The dehumidifying device 17 is disposed in flow communication between the NACA vent 15 and the respective vent tank 4, 5. The vent tanks 4, 5 further include an over pressure protector 18 and a valve 19, which can be opened to connect the interior of the vent tanks 4, 5 with ambient air.

Figure 2:
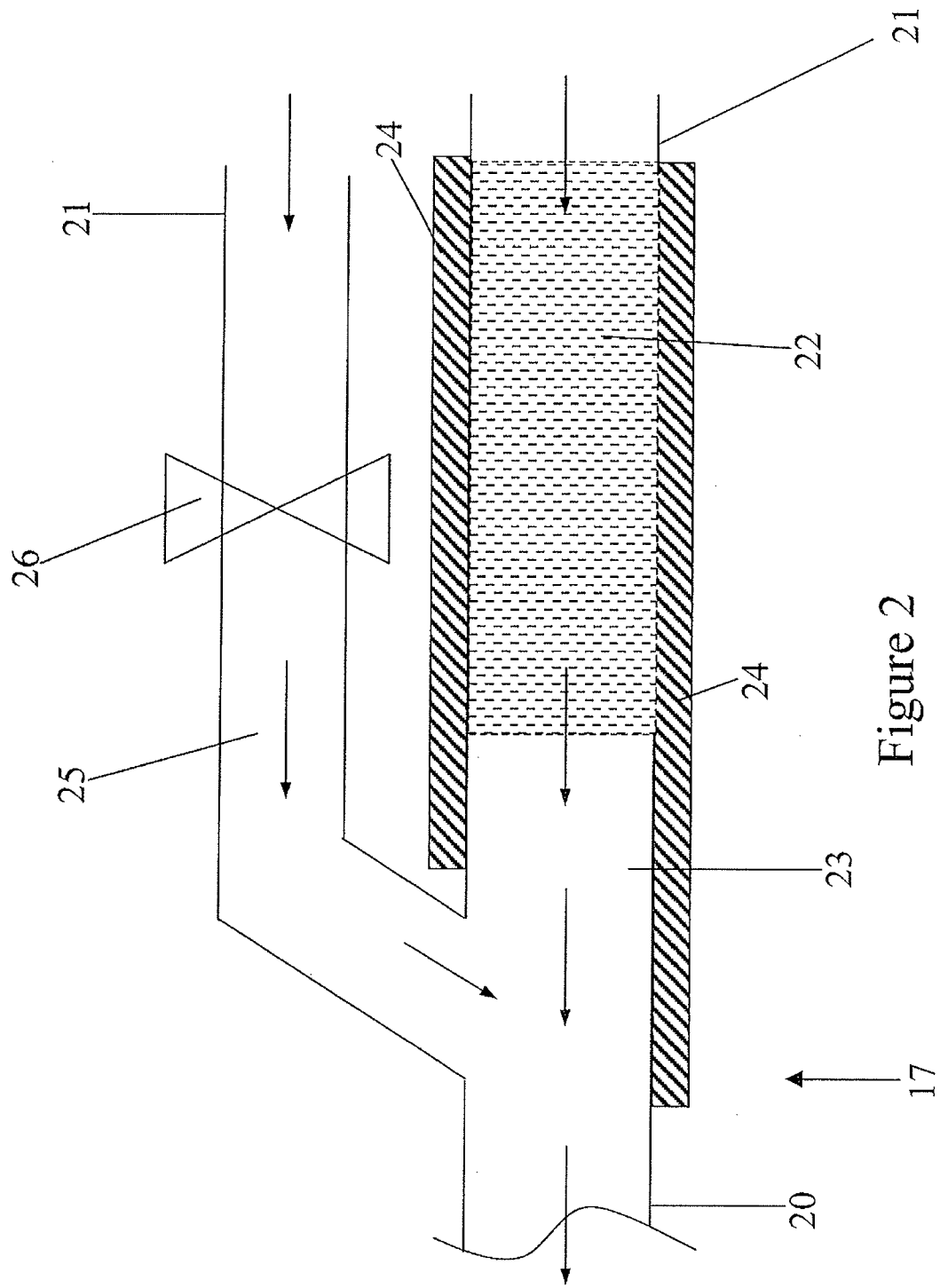
FIG. 2 illustrates schematically the dehumidifying device having a bypass.

FIG. 2 shows the dehumidifying device 17. The dehumidifying device is connected on one side 20 to the vent protector 16 and on the other side 21 to the respective vent tank 4, 5. The dehumidifying device 17 includes a desiccant medium 22 which fills a conduit 23 between the vent protector side 20 and the vent tank side 21. A heating element 24 is fixed to the outside of the conduit 23. The dehumidifying device 17 also includes a bypass conduit 25 having a valve 26 which also connects between the vent protector side 20 and the vent tank side 21. The valve 26 is selectively openable to control flow of air through the bypass 25. As can be seen from the flow arrows in FIG. 2, there is a net flow of air through the dehumidifying device 17 from the vent tank side 21 to the vent protector side 20. In FIG. 2, the valve 26 is shown in the open position with air flowing through both the bypass 25 and the desiccant medium 22.

Operation of the ventilation system will now be described with reference to FIGS. 3 to 6, which are block diagrams showing the flow paths of air and the control of the ventilation system during various aircraft flight phases. In these Figures, solid lines and blocks represent the air flow paths and flow components, and dashed lines and blocks represent the control signals and control components. The direction of the arrows between the blocks indicate the direction of air flow and the direction of control signals.

Figure 3:
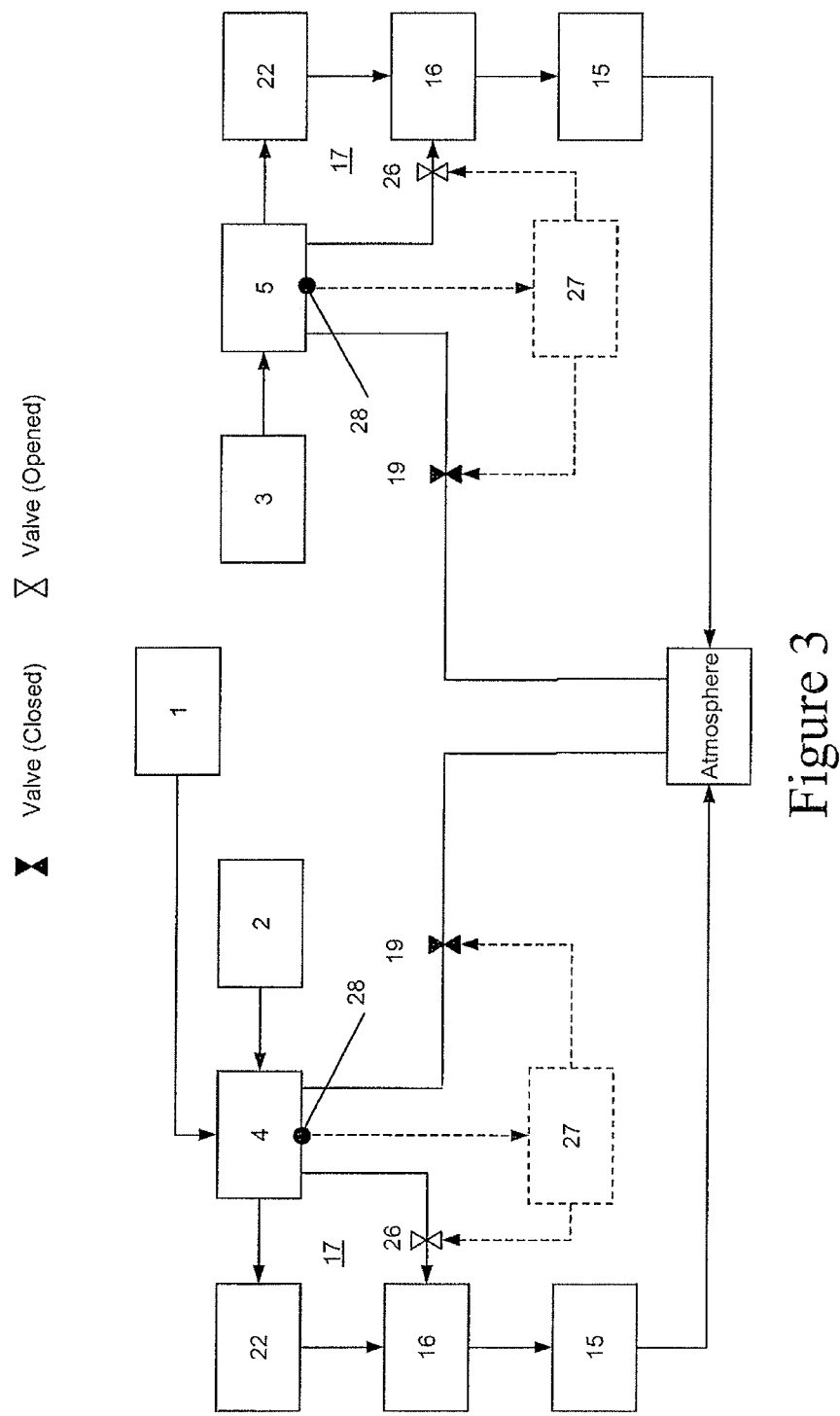
FIG. 3 illustrates a block diagram showing the flow paths of air and the control of the ventilation system during refill of the fuel tanks.

FIG. 3 shows a bock diagram of the ventilation system during refill of the fuel tanks 1, 2, 3. During refill, a high volume flow rate of fuel displaces air in the tanks 1, 2, 3 pushing the air out via the ventilation system. Air pushed out of centre tank 1 and left wing tank 2 enters left vent tank 4, whilst air pushed out of right wing tank 3 enters right vent tank 5. It is important that the air which is being pushed out from the vent tanks 4, 5 to the atmosphere passes through the vent protectors 16 so as to minimise the risk of ignition of fuel vapour within the air whilst the aircraft is on the ground. To ensure that the air passes from the vent tanks, 4, 5 to the NACA vents 15 via the vent protectors 16, the valves 19 are closed.

Due to the high volume flow rate of air being displaced from the tanks 1, 2, 3, the valves 26 are opened or partially opened such that air may pass directly from the vent tanks 4, 5 to the vent protectors 16 through the bypass 25 to prevent overpressure. However, some air will still pass through the desiccant medium 22 of the dehumidifying devices 17. It is intended that the valves 26 are controlled so that as much air as possible passes through the dehumidifying devices 17, without causing an overpressure. Control of the valves 19 and 26 is by controllers 27 which are connected to respective pressure sensors 28 on the vent tanks 4, 5. If the pressure sensors 28 detect a pressure differential higher than a critical limit between the pressure in the respective vent tank 4,5 and ambient, then valves 26 can be opened appropriately. While the aircraft is on the ground, the valves 19 are closed at all times so that the flow communication to the tanks 1,2,3 passes through the vent protectors 16 for safety. The air passing through the desiccant medium 22 during refill is relatively dry and so aids in drying the desiccant medium 22 to regenerate it. The air in the tanks 1,2,3 will have previously been dried by the desiccant medium 22 during descent.

Figure 4:
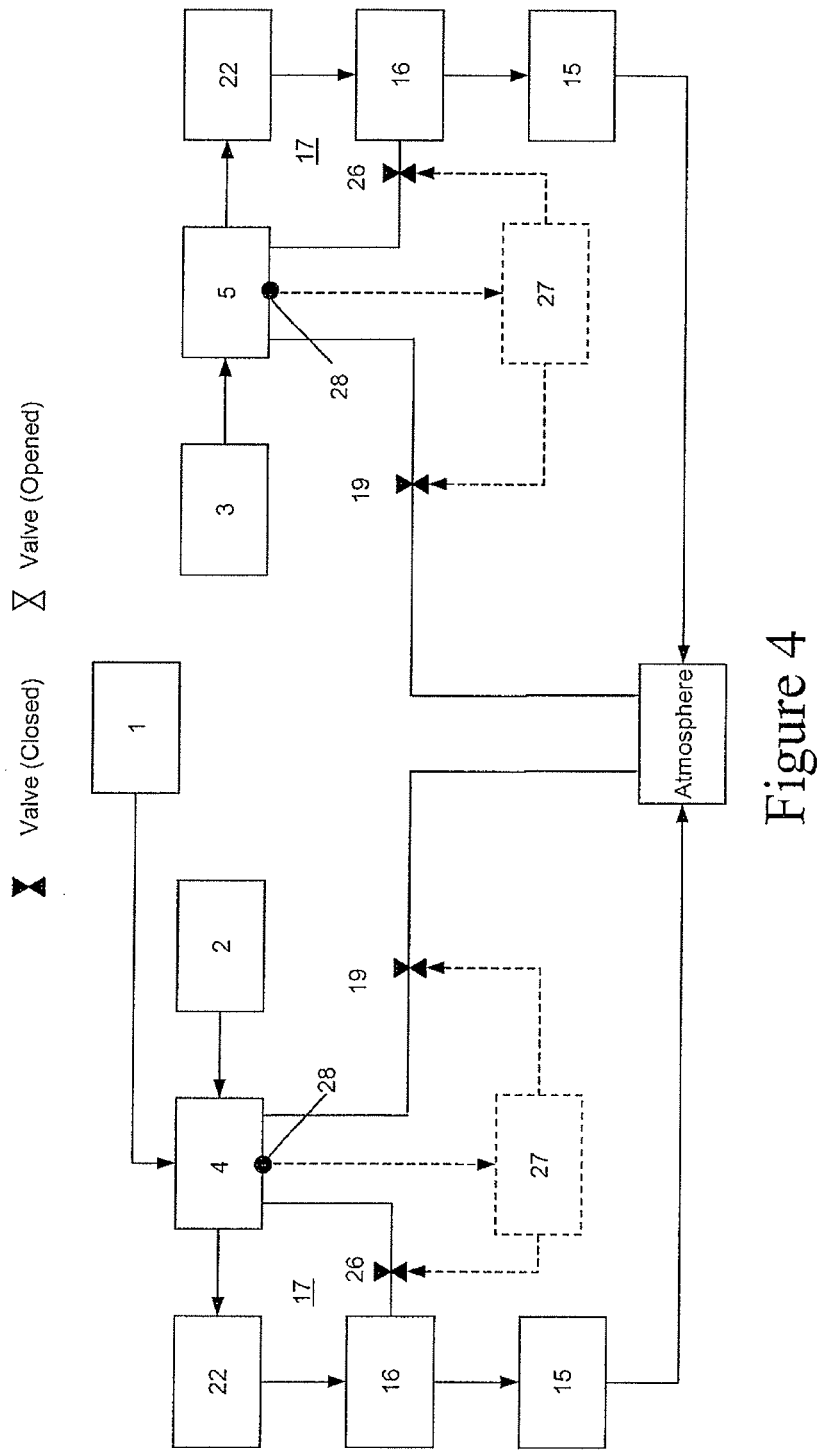
FIG. 4 illustrates a block diagram showing the flow paths of air and the control of the ventilation system during climb.

FIG. 4 shows a block diagram of the ventilation system during climb. As shown in FIG. 4, the valves 19 and 26 are all closed such that as the air in the fuel tanks 1, 2, 3 expands as the aircraft ascends, a relatively low volume flow rate of air is discharged through the desiccant medium 22 from the vent tank side 21 to the vent protector side 20 and out through the NACA vents 15. The desiccant medium 22 will have absorbed moisture from a previous flight, as will be discussed below. The air passing through the desiccant medium 22 during the climb is relatively dry and so aids in drying the desiccant medium 22 to regenerate it.

Figure 5:
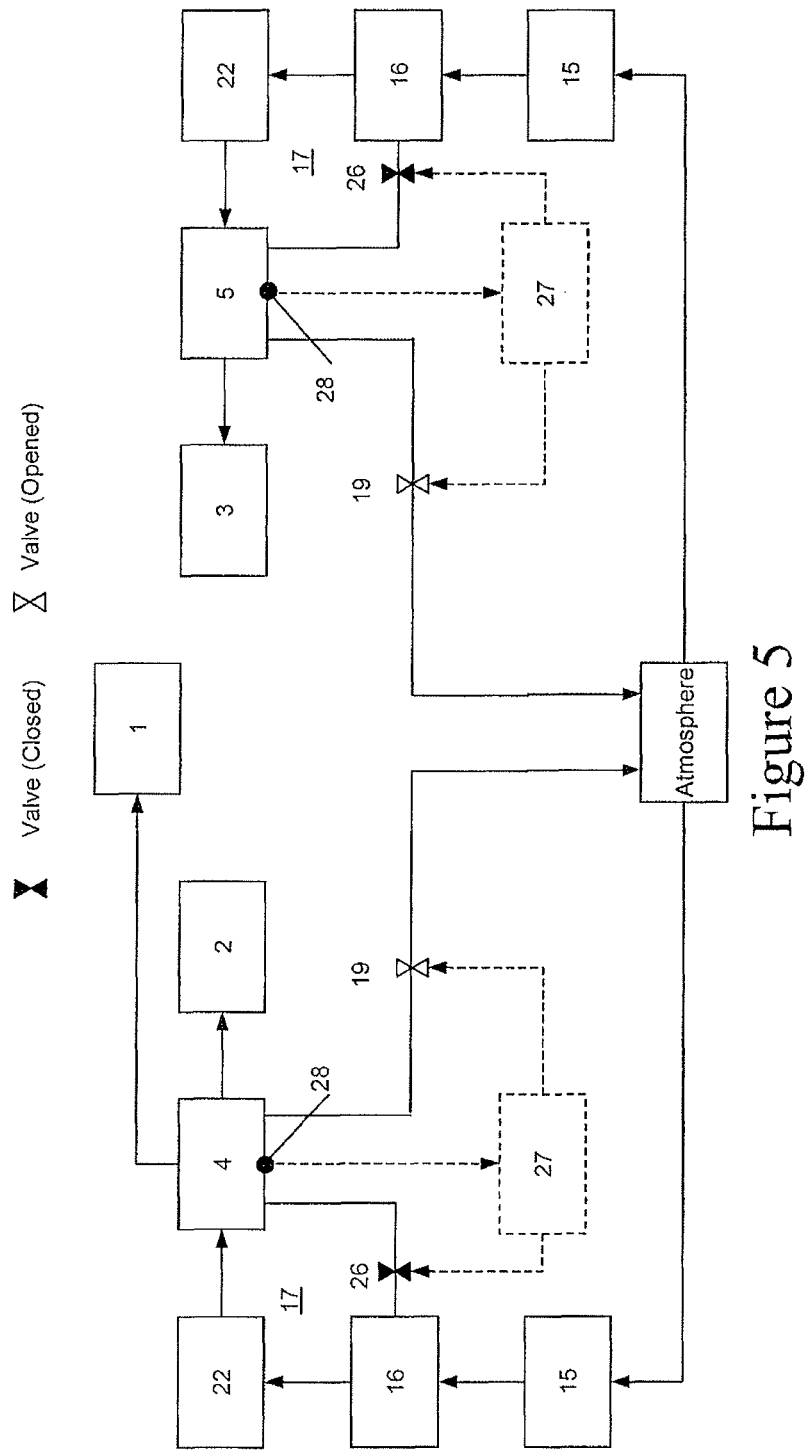
FIG. 5 illustrates a block diagram showing the flow paths of air and the control of the ventilation system during cruise.

FIG. 5 shows a block diagram of the ventilation system during cruise. During cruise, fuel in the tanks 1, 2, 3 is being consumed by the aircraft engines and so there is a net in-flow of air from the atmosphere through the NACA vents 15 towards the tanks 1, 2, 3. As shown in FIG. 5, the valves 19 are open so as to allow air circulation through the NACA vent 15, into the vent tanks 4, 5 and to return out to the atmosphere. As can be seen in FIG. 1, the valve 19 is positioned aft of the NACA vent 15 so as to cause a pressure differential to drive the flow of air through the respective vent tanks 4, 5. The valves 26 are closed at cruise such that air circulating through the vent tanks 4, 5 passes from the NACA vent 15 and through the desiccant medium 22 before entering the vent tanks 4, 5. At cruise, cold, dry atmospheric air flows from the vent protector side 20 of the dehumidifying device 17 and is warmed by the heating element 24 as it passes through the desiccant medium 22 towards the vent tank side 21. The heating element 24 heats both the air on the vent protector side 20 and the desiccant medium 22 itself so as to optimise drying of the desiccant medium 22. Moisture is released from the desiccant medium 22 and absorbed by the air such that warm, humid air is discharged into the vent tanks 4, 5 before returning to the atmosphere via the valves 19. There is negligible flow of air to the tanks 1, 2, 3 during cruise, and so moisture released from the desiccant medium 22 does not substantially enter the tanks 1, 2, 3. In this way, moisture that has previously been absorbed by the desiccant material 22 during other flight phases is removed during cruise such that the dehumidifying devices 17 require little or no maintenance. The heating element 24 also heats the conduit 23 to prevent ice accumulation.

Figure 6:
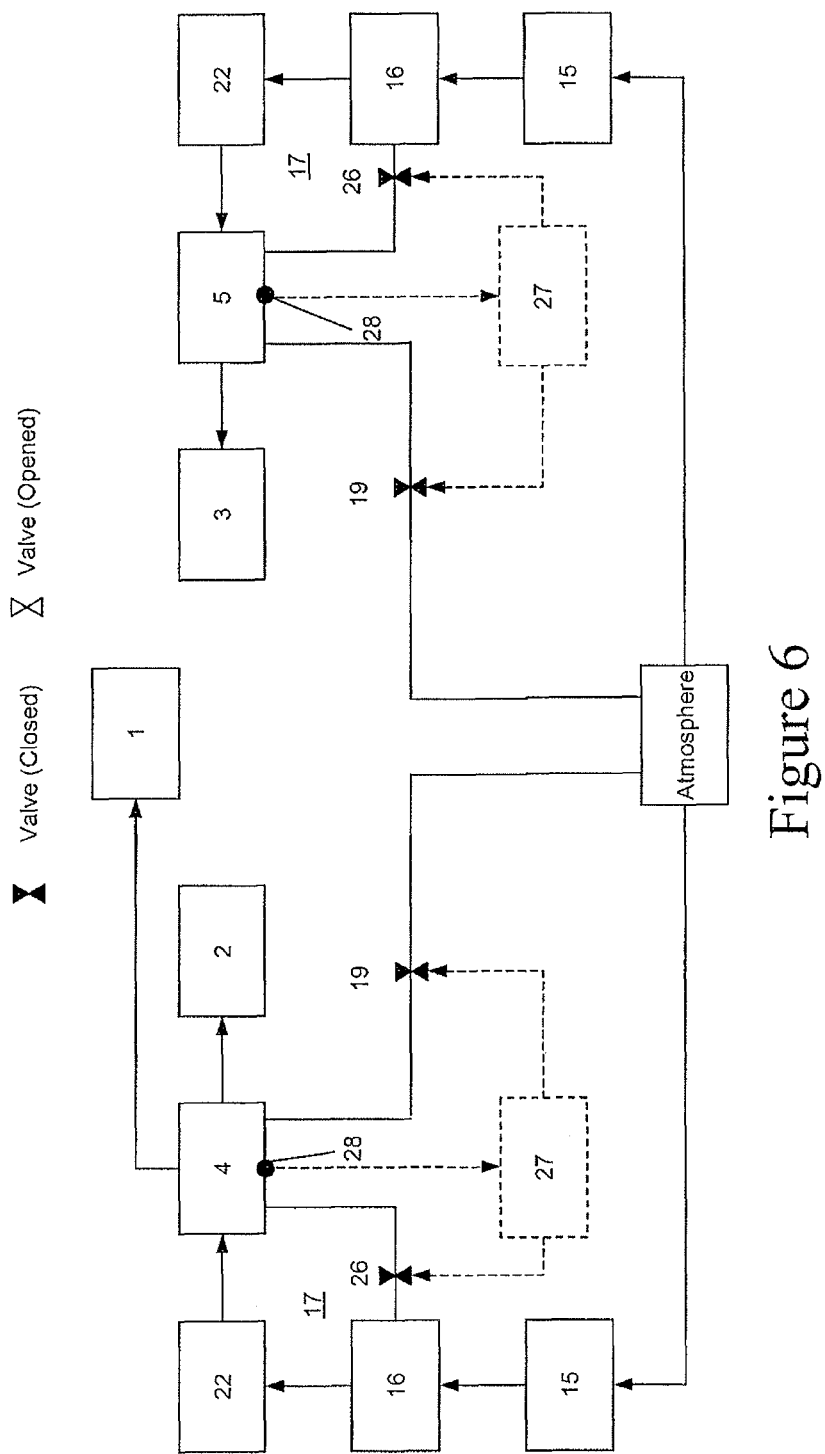
FIG. 6 illustrates a block diagram showing the flow paths of air and the control of the ventilation system during descent.

As mentioned previously, the dehumidifying devices 17 operate to remove water vapour from air flowing from the NACA vents 15 towards the tanks 1, 2, 3 during the descent phase of the aircraft flight. FIG. 6 shows a block diagram of the ventilation system during descent. As can be seen, the valves 19 and 26 are all closed. As the aircraft descends from high altitude, the contraction of air within the now largely empty fuel tanks 1, 2, 3 contracts significantly which causes a net flow of air from the atmosphere through the NACA vent 15 into the tanks 1, 2, 3. Since the valves 19 and 26 are all shut, the relatively warm, humid air flows in from the atmosphere through the NACA vents 15, the vent protectors 16 and through the desiccant medium 22 of the dehumidifying devices 17.

The desiccant medium 22 acts to dehumidify the air passing from the vent protector side 20 to the vent tank side 21 of the dehumidifying devices 17 by absorbing the moisture from the air passing therethrough. Relatively dry (dehumidified) air is discharged into the vent tanks 4, 5 and then via the arrangement of pipes 6, 7, 12 into the tanks 1, 2, 3. In this way, the dehumidifying devices 17 act to significantly dehumidify the air entering the aircraft fuel tanks 1, 2, 3 during descent and hence significantly reduce the amount of water within the fuel tanks.

The damp desiccant medium 22 retains the moisture absorbed during descent until it is once again dried during other flight phases as previously described.

To improve the effectiveness of the desiccant medium 22 during descent, the heating element 24 which is used to dry the desiccant medium 22 during cruise is switched off for a period of time, for example 5 minutes, before the descent. As the aircraft is still at high altitude at this stage, the desiccant medium 22 is allowed to cool to cruise ambient temperature before the descent. The cold desiccant medium 22 provide cold surfaces for moisture to condense upon as the aircraft begins the descent phase of the flight. This is a secondary effect to the desiccant property of the desiccant medium 22, and further increases the dehumidifying effectiveness of the dehumidifying devices 17.

Figure 7:
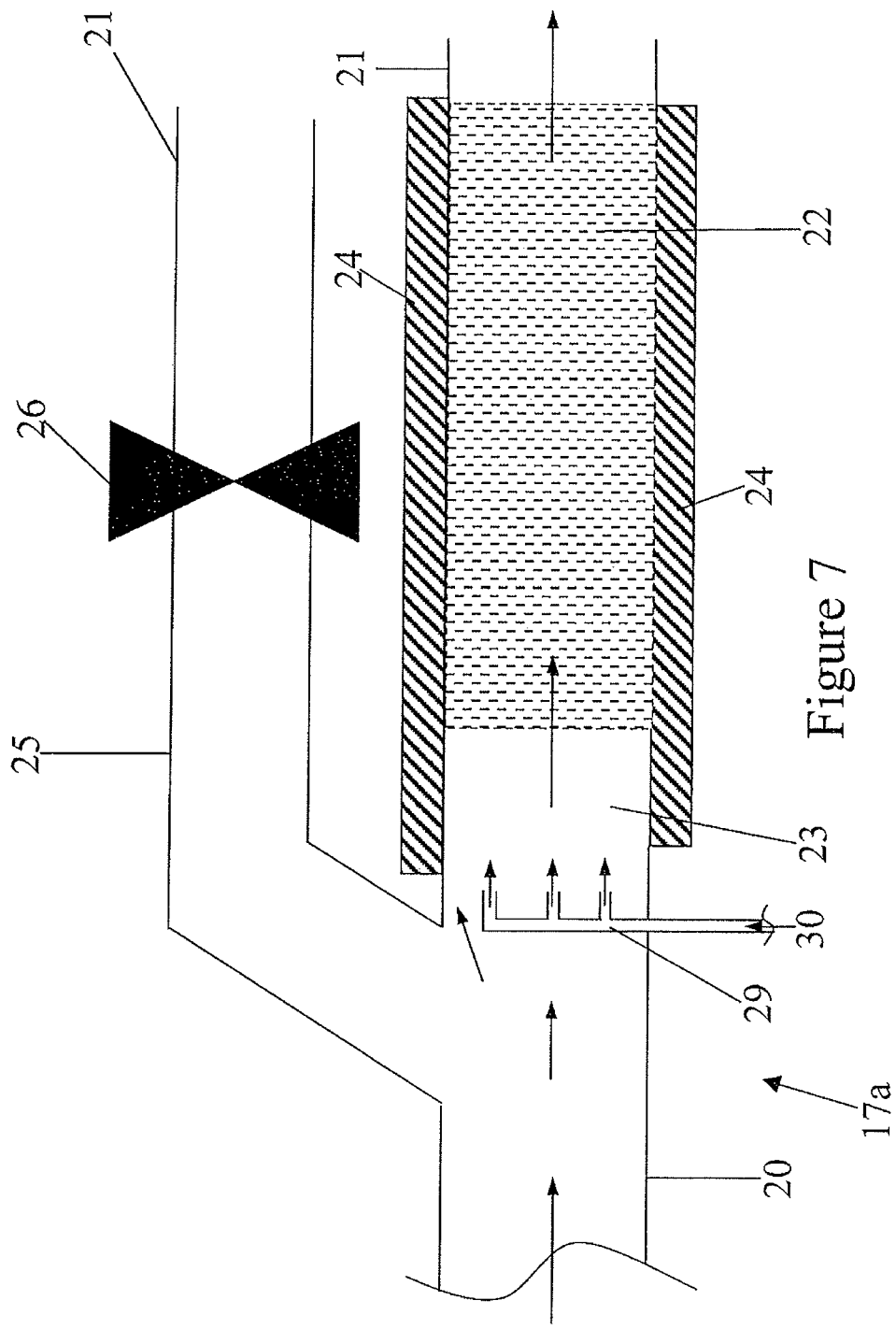
FIG. 7 illustrates schematically an alternative dehumidifying device including a device connected to the aircraft wing anti-icing system.
Figure 8:
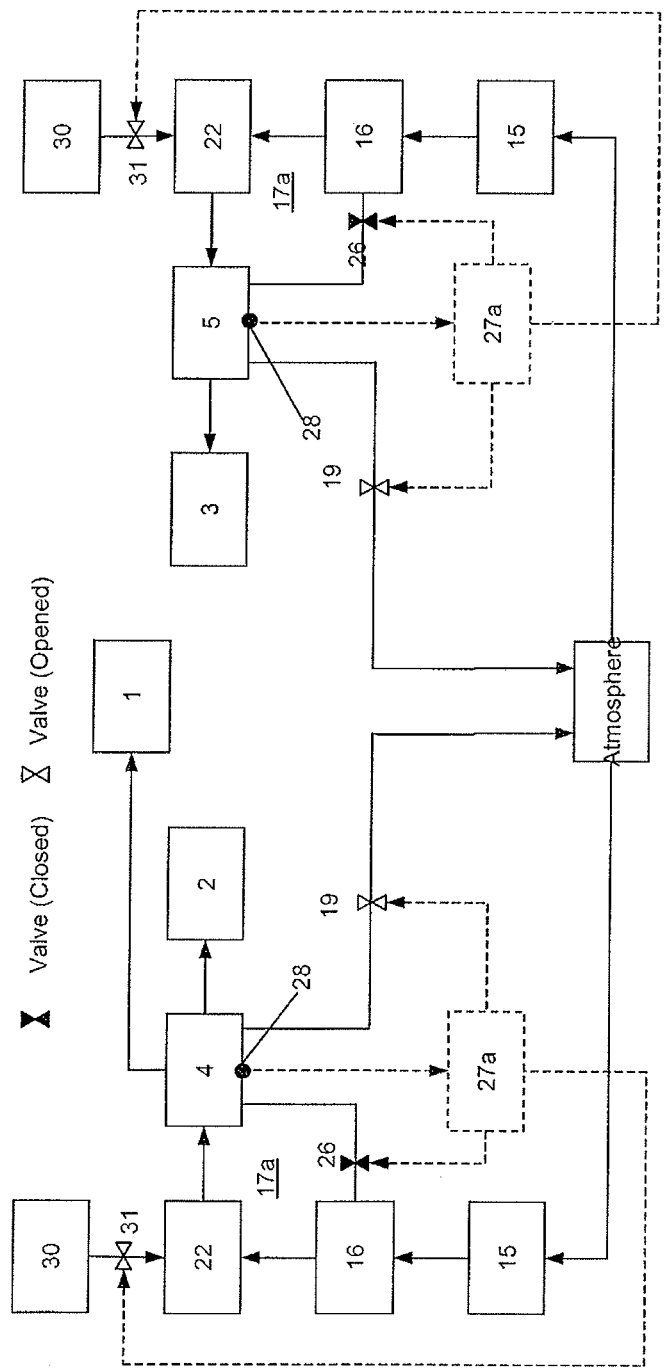
FIG. 8 illustrates a block diagram showing the arrangement of flow paths of air and the control of the ventilation system including the dehumidifying device of FIG. 7 during cruise.

FIGS. 7 and 8 show an alternative embodiment of a ventilation system of this invention. The alternative ventilation system includes dehumidifying devices 17a, shown in FIG. 7, which are similar in many respects to the dehumidifying device 17 shown in FIG. 2. Like parts are denoted by like reference numerals and only the differences between the dehumidifying device 17a and the dehumidifying device 17 will now be described.

The dehumidifying device 17a further includes a piccolo tube distributor 29 positioned adjacent to the desiccant medium 22 on the vent protector side 20. The distributor 29 is connected to the aircraft wing anti-icing system (WAIS) 30 so as to inject hot air towards the desiccant medium 22. The piccolo distributor 29 is disposed in the conduit 23 and the hot air injected towards the desiccant medium 22 induces a high flow rate of air through the conduit 23, so increasing the regenerative efficiency by drying the desiccant medium 22 more effectively. The hot air injected into the conduit 23 from the piccolo distributor 29 rapidly mixes with the flow of air from the vent protector 16 on the vent protector side 20 of the dehumidifying device 17a, which reduces the temperature of the hot air exiting the piccolo distributor 29 to an optimal condition for drying the desiccant medium 22. The WAIS is not typically used during cruise, as there is little likelihood of encountering ice at about 33,000 ft. However, the WAIS 30 can additionally be used on demand during cruise to inject hot air into the dehumidifier device 17a to regenerate the desiccant medium 22.

FIG. 8 shows a block diagram of the alternative ventilation system including the dehumidifying devices 17a and the WAIS 30 during cruise. As can be seen from FIG. 8, the WAIS 30 is connected to the dehumidifier devices 17a by valves 31 which are selectively controlled between open and closed positions by controllers 27a. The controllers 27a replace the controllers 27 of the previous embodiment. The controllers 27a control the valves 31 so as to be open only during the cruise phase of the aircraft flight. In all other respects, the ventilation system shown in FIG. 8 in the cruise is identical to that of the previous embodiment. This alternative ventilation system operates identically to that of the previous embodiment in all other flight phases with the valves 31 shut under control of the controllers 27a.

Figure 9:
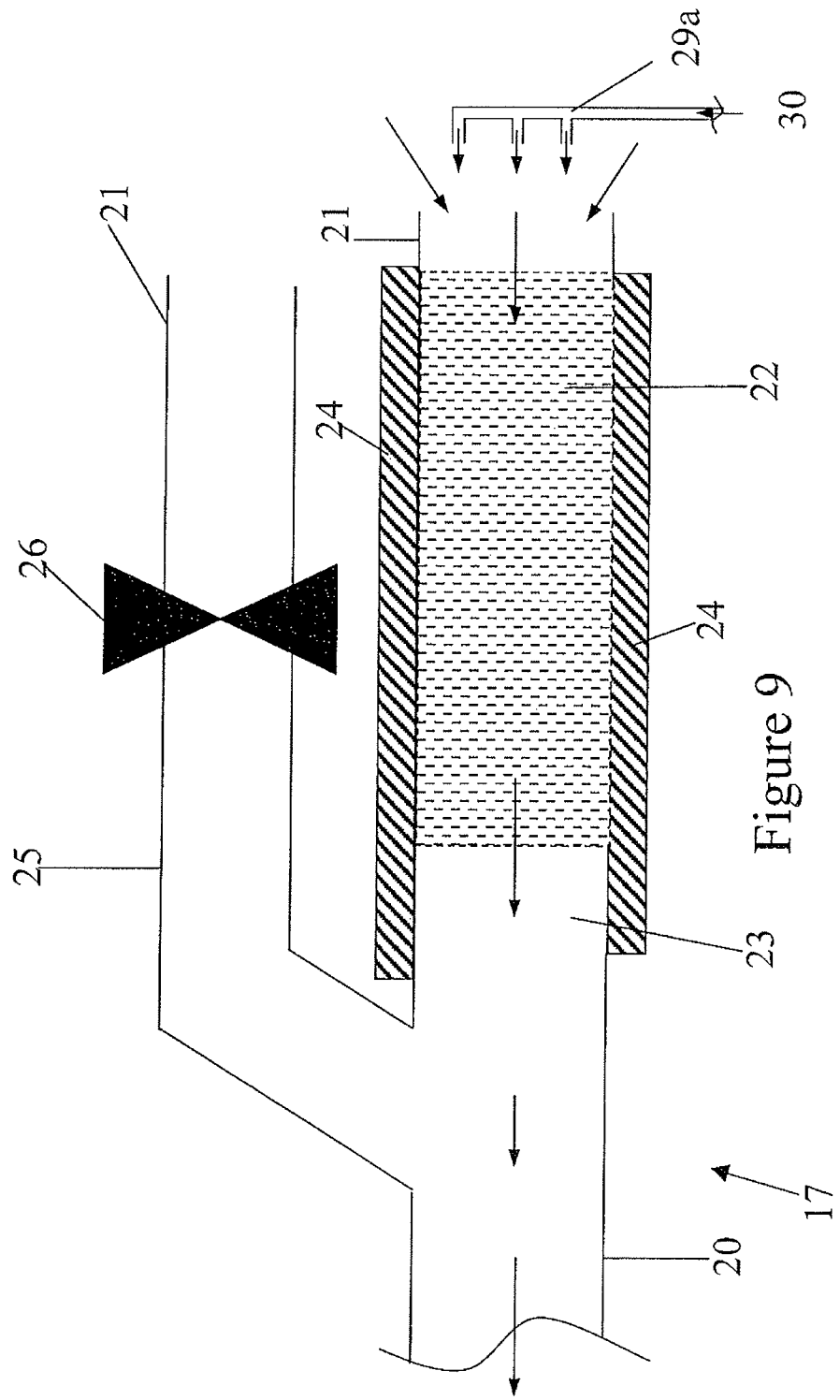
FIG. 9 illustrates schematically the dehumidifying device of FIG. 2 with a device connected to the aircraft wing anti-icing system.
Figure 10:
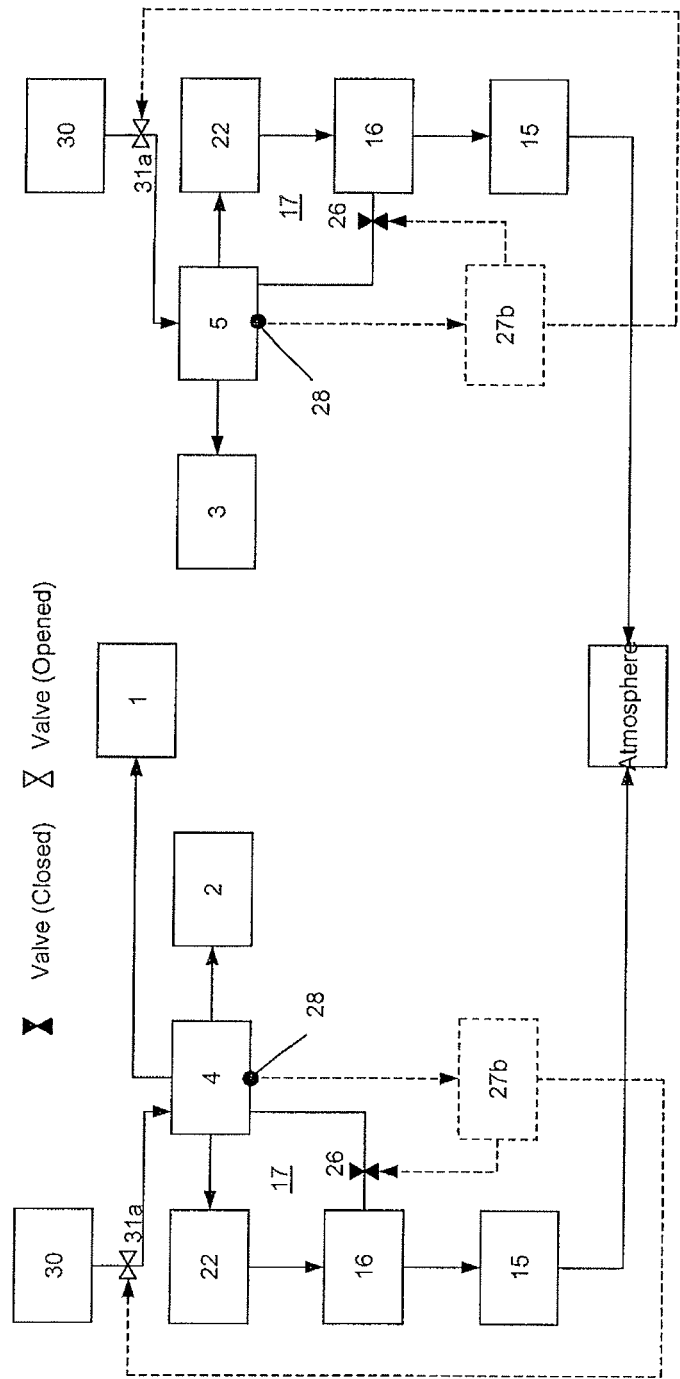
FIG. 10 illustrates a block diagram showing an alternative arrangement of the flow paths of air and the control of the ventilation system including the dehumidifying device of FIG. 9 during cruise.

FIGS. 9 and 10 show a further alternative embodiment of a ventilation system of this invention. The alternative ventilation system includes the dehumidifying devices 17 shown in FIG. 2 and a piccolo distributor 29a positioned adjacent the desiccant medium on the vent tank side 21 in the vent tanks 4,5, as shown in FIG. 9. The distributor 29a is connected to the aircraft wing anti-icing system (WAIS) 30. The hot air injected into the vent tanks 4,5 from the piccolo distributor 29a rapidly mixes with the air in the vent tanks 4,5 on the vent tank side 21 of the dehumidifying device 17, which reduces the temperature of the hot air exiting the piccolo distributor 29a to an optimal condition for drying the desiccant medium 22. It is to be noted that the spent air from the WAIS 30 is typically only injected into the vent tanks 4,5 during cruise.

FIG. 10 shows the alternative ventilation system in the cruise configuration. Only the differences between the ventilation systems shown in FIGS. 8 and 10 will now be described and like reference numerals denote like parts.

In FIG. 10, the valves 19 connecting the vent tanks 4, 5 to the atmosphere have been omitted; the controllers 27a have been replaced by controllers 27b due to the omission of valves 19; the dehumidifier devices 17a have been replaced by dehumidifier devices 17; and the valves 31 have been replaced with valves 31a which discharge spent hot air from the WAIS 30 directly into the vent tanks 4, 5, rather than into the dehumidifier devices 17. The spent hot air from the WAIS 30 is selectively directed under the control of valves 31a, controlled by controllers 27b, into the vent tanks 4, 5 and through the dehumidifying devices 17 so as to dry the desiccant medium 22 and discharge humid air through the vent protectors 16 to the NACA vents 15 and into the atmosphere. Note that the volume of air injected through the piccolo tube distributor 29a from the WAIS 30 is in excess of the air required in the tanks 1,2,3 due to fuel usage. The excess air flows out of the vent tanks 4,5 through the desiccant medium 22 and humid air is discharged through the vent protectors 16 to the NACA vents 15 and into the atmosphere.

The embodiment shown in FIG. 10 relies solely on driving hot air from the WAIS 30 through the desiccant medium 22 to dry it during cruise, rather than recirculating air in the vent tanks 4,5.

Those skilled in the art will appreciate that instead of spent air from the WAIS, bleed air from the aircraft engines may be used instead in the ventilation systems shown in FIGS. 7 to 10.

Although the invention has been described in relation to a three-tank fuel system, the invention is applicable to a fuel system having any number of tanks, including one.

Where a condenser is used as the dehumidifying device instead of the desiccant medium, the water collected in the condenser will need to be drained off periodically during ground maintenance activities, or else mixed with fuel and fed to the aircraft engines to be burnt off during flight.

Although the invention has been described above with reference to one or more preferred embodiments, it will be appreciated that various changes or modifications may be made without departing from the scope of the invention as defined in the appended claims.

The invention claimed is:

1. An aircraft fuel tank ventilation system, comprising a dehumidifying device disposed in flow communication between a vent open to the ambient atmosphere and a fuel tank, wherein the dehumidifying device includes a desiccant medium for removing water vapour from ambient air flowing from the vent towards the fuel tank, and the ventilation system further comprising a valve for directing a flow of air through the dehumidifying device for regenerating the desiccant medium, and an outlet for discharging the regenerative air that has passed through the desiccant medium to the ambient atmosphere, and wherein the valve is selectively openable and in its open position also provides the outlet, and the outlet is positioned aft of the vent such that forward movement of the aircraft creates a pressure differential between the vent and the outlet to drive the flow of regenerative air through the dehumidifying device.

2. The ventilation system according to claim 1, wherein the dehumidifying device includes a heating element for heating the desiccant medium.

3. The ventilation system according to claim 1, further comprising a hot air outlet disposed adjacent the desiccant medium.

4. The ventilation system according to claim 1, wherein the valve is operatively connected to a hot air outlet for delivering a supply of hot regenerative air through the dehumidifying device.

5. The ventilation system according to claim 4, wherein the hot air outlet is disposed adjacent the desiccant medium.

6. The ventilation system according to claim 1, further comprising a bypass of the dehumidifying device in flow communication between the vent and the fuel tank.

7. The ventilation system according to claim 6, wherein the bypass includes a valve.

8. The ventilation system according to claim 1, wherein the dehumidifying device is disposed in flow connection between the vent and a vent tank.

9. A method of regenerating a desiccant medium of a dehumidifying device in an aircraft fuel tank ventilation system, wherein the dehumidifying device is disposed in flow communication between a vent open to the ambient atmosphere and a fuel tank, and the desiccant medium is adapted to remove water vapour from ambient air flowing from the vent towards the fuel tank, the method comprising directing a flow of air through the dehumidifying device for regenerating the desiccant medium, and discharging the regenerative air that has passed through the desiccant medium to the ambient atmosphere via an outlet, and wherein the outlet is positioned aft of the vent, and forward movement of the aircraft causes a pressure differential between the vent and the outlet to drive the flow of regenerative air through the dehumidifying device.

10. The method according to claim 9, further comprising heating the desiccant medium.

11. The method according to claim 9, further comprising directing a supply of hot air towards the desiccant medium.

12. The method according to claim 9, wherein the method further comprises delivering a supply of hot regenerative air through the dehumidifying device.

13. The method according to claim 9, wherein the method is operated during a cruise phase of an aircraft flight.

* * * * *